Feb. 21, 1939.    T. V. BUCKWALTER    2,148,149
CRANKPIN BEARING
Filed Nov. 14, 1936    2 Sheets-Sheet 1

INVENTOR:
Tracy V. Buckwalter,
by Carlton Gravely,
HIS ATTORNEYS

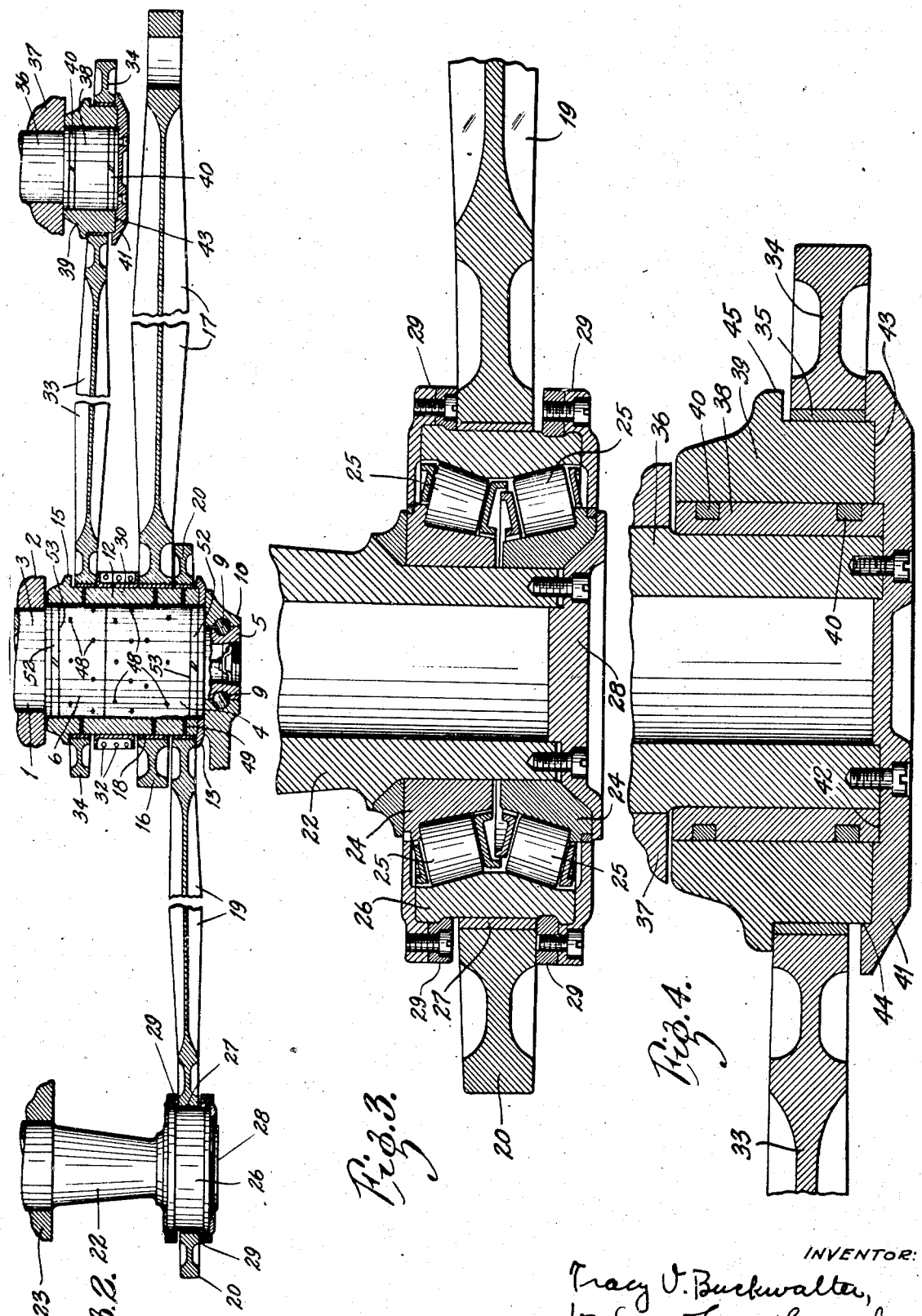

Patented Feb. 21, 1939

2,148,149

UNITED STATES PATENT OFFICE 2,148,149

CRANKPIN BEARING

Tracy V. Buckwalter, Canton, Ohio, assignor to The Timken Roller Bearing Company, Canton, Ohio, a corporation of Ohio Application November 14, 1936, Serial No. 110,826

6 Claims. (Cl. 74—580)

My invention relates to bearings for locomotive and other crank pins. It has for its principal object a plain bearing arrangement for such crank pins which has many of the advantages of the roller bearing crank pin construction of my Patent No. 1,951,126. Other objects are strength and simplicity of construction, easy assembly and disassembly of the bearings, adequate lubrication and accommodation of the cocking of drive rods which necessarily occurs in locomotive service. The invention consists in the crank pin bearing and in the parts and combinations and arrangements of parts hereinafter described and claimed.

In the accompanying drawings,

Fig. 2 is a horizontal sectional view through a plurality of crank pin bearings and drive rods;

Fig. 3 is a sectional view of the rear wheel roller bearing; and

Fig. 4 is a sectional view of the front wheel bearing.

Figure 1:
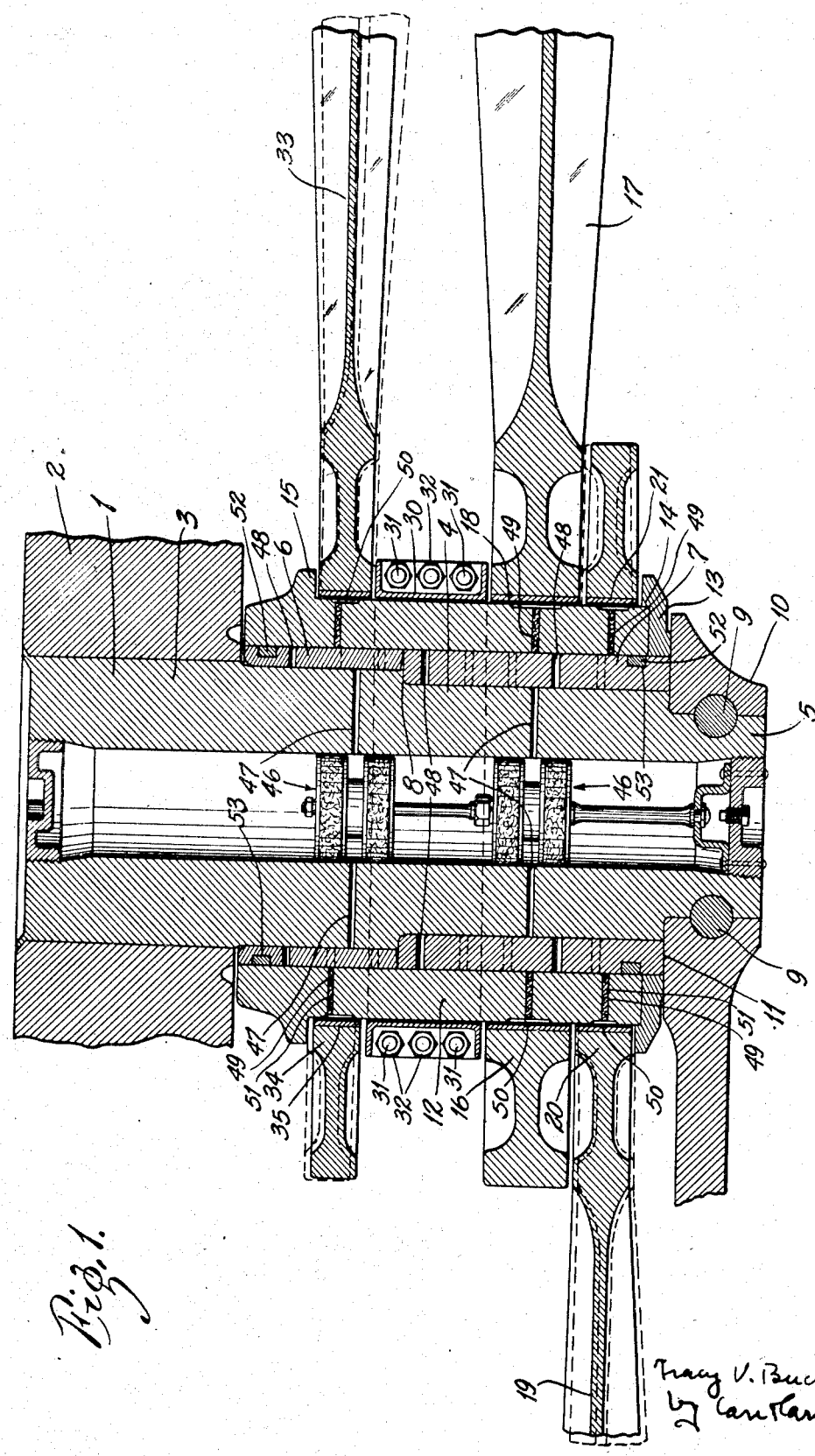
Fig. 1 is a sectional view of a main crank pin bearing embodying my invention, together with portions of the locomotive drive rods.

In Fig. 1 is illustrated the hollow main crank pin 1 of a locomotive drive wheel 2. The innermost portion 3 of said crank pin, that is the portion adjacent to the wheel, is of larger outside diameter than the body portion 4 outwardly thereof and the outermost end portion 5 is further reduced in diameter.

Rotatably mounted on the enlarged innermost portion 3 of the crank pin 1, adjacent to the wheel hub, is a plain bearing, preferably a sleeve 6 of bronze or other bearing metal. Rotatably mounted on the reduced body portion 4 of the crank pin adjacent to said innermost portion 3 is a second bearing sleeve 7, also of bronze or other suitable bearing metal, whose outside diameter is the same as the outside diameter of the above mentioned bearing sleeve 6 and whose innermost end is seated against the shoulder 8 formed by the end of the enlarged innermost portion of the crank pin. Fixed on the outermost end portion 5 of the crank pin 1, as by dowel pins 9, is a securing ring 10 which has a flat inner face 11 bearing against the outer end of the floating bronze bushing 7 and projecting radially therebeyond. Rotatable on the bushing 6 and the bushing 7 is a main bushing sleeve 12, which is preferably of iron or steel or other hard, strong metal. This main bushing 12 is held in place by means of a ring 13 mounted on the outermost end of the floating bushing 7 and having an inwardly projecting flange 14 around the periphery of its inner face, overlapping the outer end of the main bushing 12. Said ring is held in place by said securing ring 10 which overlaps it. Said main bushing 12 has an annular flange 15 near its innermost end with a flat inner face.

Mounted on the main bushing 12 by means of a circular eye 16 is the main drive rod 17, the eye preferably having a liner ring 18 of bronze or other suitable bearing metal. The main rod 17 extends forwardly to the cross head of the locomotive (not shown) by which it is driven and to which it is connected in any suitable way.

Similarly mounted on the main bushing 12 outwardly of the main rod 17 is a rear side rod 19 having an eye 20 lined with a bearing ring 21. Said rear side rod 19 extends rearwardly to the crank pin 22 of the next adjacent drive wheel 23. The bearing for said crank pin is illustrated as being a roller bearing of the kind shown in said Patent No. 1,951,126, comprising two cones 24 or inner bearing members mounted on said crank pin 22, with their raceways tapering towards each other, taper rollers 25 on said raceways and a double bearing cup 26 rotatable in a bearing ring 27 mounted in the eye 20 of said rear side rod 19. A cap 28 secured to the end of the crank pin 22 holds the bearing cones in place. Rings 29 on said cup 26 constitute abutments for the side rod 19 but are spaced apart sufficiently to accommodate cocking of said rod.

Mounted on the main bushing 12 adjacent to said rib 15 is a channel shaped split spacer member 30 secured together by bolts 31 and nuts 32. The distance from said ring 13 to said spacer 30 is greater than the combined width of the main rod 17 and the rear side rod 19. Thus the cocking of the rods, incident to locomotive service, is accommodated. The dotted lines in the drawings show the rods in cocked position.

A front side rod 33 whose eye 34 is provided with a bearing ring 35 is mounted on said main bushing 12 on the other side of said spacer 30 from the main rod 17. The front side rod 33 extends forwardly to the crank pin 36 of the next adjacent locomotive drive wheel 37. Rotatably mounted on said crank pin 36 is a bushing 38 of bronze or other bearing material, on which is rotatably mounted a main bushing 39 of cast iron or other hard metal that is rotatable in another bearing ring 35 in the other eye 34 of said crank pin. Said bushing is provided with rings 40 similar to those of the other floating bushings 6 and 7. A cap 41 secured to the end of the crank pin 36 has an annular zone 42 engaging the end of said floating bushing 38, an inwardly stepped annular zone 43 that overlaps said floating bushing 38 and that engages the end of said main bushing 39 and an inwardly stepped peripheral zone 44 that overlaps said main bushing and serves as a stop for the side rod 33. A flange 45 on said main bushing forms a stop for the other side of said side rod 33, the two stops being spaced apart to accommodate cocking of the rod.

Mounted in the bore of the main crank pin 1 is a lubricating device 46, preferably of the type disclosed in my Patent No. 2,040,803. The crank pin 1 is provided with radial passageways 47 therethrough and the floating bushing 6 and the floating bushing 7 are also provided with a plurality of radial passageways 48 therethrough. The main bushing 12 is provided with radial passageways 49 whose outer ends open into annular recesses 50 extending around the outer periphery of the main bushing 12 within the several bearing liners. The radial passageways 49 in said bushing are preferably provided with suitable wick members 51. Thus, lubricant from the crank pin bore passes through the passageways 47 of the crank pin, the passageways 48 of the floating bushings and the passageways 49 of the main bushing into the annular peripheral passageways 50 where it is distributed over the bronze liner members. The passageways 47 of the crank pin are not in direct alinement with those 48 of the floating bushings and the passageways 48 of the floating bushings are not in direct alinement with those 49 of the main bushing, so that some of the oil finds its way into the spaces between the crank pin 1 and the floating bushings 6 and 7 and the space between the floating bushings, and the main bushing 12. Thus all moving parts are adequately lubricated, the flow of lubricant being controlled by the lubricating device 46 in the crank pin. To prevent escape of lubricant, split rings 52, similar to the commonly used piston rings, are seated in annular grooves 53 near the ends of the floating bushings 6 and 7, bearing against the inner periphery of the main bushing 12. Thus, outward escape of the lubricant at these points is prevented and an internal pressure is built up that forces the lubricant to spread along the several bearing surfaces.

It will be seen that the above bearing is one that can be used on stepped crank pins similar to those now commonly in use and that it can be easily substituted for the roller bearing arrangement of my Patent No. 1,951,126. Cocking of the main rod and side rods, which is inevitable in service, is accommodated without destroying the full surface bearing of the crank pins on the floating bushings and the main bushings. The use of two floating bushings permits the relative movement between them that is likely to occur due to the larger load on the larger floating bushing. The load from piston to crank pins is largely transmitted through the main bushings instead of passing through the bearings and the main bushing is preferably made of iron or steel or other strong material so as to have greater load carrying and transmitting capacity.

It is obvious that bearings of the kind above described may be placed on the crank pins of locomotive drive arrangements of all kinds, from a simple single drive wheel and single drive rod arrangement up to the largest multiple drive wheel arrangements. Likewise, the plain bearing arrangement may be used on all crank pins or on the main crank pin and one or more of the other crank pins, while still other crank pins have roller bearings of the kind shown in my said Patent No. 1,951,126. Obviously, numerous changes may be made without departing from the invention and I do not wish to be limited to the precise construction shown.

What I claim is:

1. A locomotive rod bearing comprising a stepped crank pin, a main rod having an eye receiving the reduced body portion of said crank pin, a side rod having an eye receiving the larger innermost portion of said crank pin, floating bushings mounted respectively on said reduced body portion and said larger innermost portion of said crank pin, said bushings having the same outside diameter, a floating main bushing mounted on said first mentioned floating bushings, said main rod and said side rod being journaled on said main bushing and bushing rings in said eyes of said rods for cooperating with said main bushing.

2. A locomotive rod bearing comprising a stepped crank pin, a main rod having an eye receiving the reduced body portion of said crank pin, a side rod having an eye receiving the larger innermost portion of said crank pin, floating bushings mounted respectively on said reduced body portion and said larger innermost portion of said crank pin, said bushings having the same outside diameter, a floating main bushing mounted on said first mentioned floating bushings, said crank pin, floating bushings and main bushing having radial lubricant passageways therethrough, said main rod and said side rod being journaled on said main bushing and bushing rings in said eyes of said rods for cooperation with said main bushing.

3. A locomotive rod bearing comprising a stepped crank pin, a main rod having an eye receiving the reduced body portion of said crank pin, a side rod having an eye receiving the larger innermost portion of said crank pin, floating bushings mounted respectively on said reduced body portion and said larger innermost portion of said crank pin, said bushings having the same outside diameter, a floating main bushing mounted on said first mentioned floating bushings, said crank pin, floating bushings and main bushing having radial lubricant passageways therethrough, said passageways being out of alinement with respect to each other, said main rod and said side rod being journaled on said main bushing and bushing rings in said eyes of said rods for cooperation with said main bushing.

4. A locomotive rod bearing comprising a stepped crank pin, a main rod having an eye receiving the reduced body portion of said crank pin, a side rod having an eye receiving the larger innermost portion of said crank pin, floating bushings mounted respectively on said reduced body portion and said larger innermost portion of said crank pin, said bushings having the same outside diameter, a floating main bushing mounted on said first mentioned floating bushings, said crank pin, floating bushings and main bushing having radial lubricant passageways therethrough, sealing rings in the ends of said floating bushing bearing against the bore of said main bushing, said main rod and said side rod being journaled on said main bushing and bushing rings in said eyes of said rods for cooperation with said main bushing.

5. A locomotive rod bearing comprising a stepped crank pin, a main rod having an eye receiving the reduced body portion of said crank pin, a side rod having an eye receiving the larger innermost portion of said crank pin, floating bushings mounted respectively on said reduced body portion and said larger innermost portion of said crank pin, said bushings having the same outside diameter, a floating main bushing mounted on said first mentioned floating bushings, said main rod and said side rod being journaled on said main bushing, bushing rings in said eyes of said rods for cooperation with said main bushing and abutment means for said main rod and said side rod spaced therefrom sufficiently to permit cocking thereof.

6. A locomotive rod bearing comprising a stepped crank pin, a main rod having an eye receiving the reduced body portion of said crank pin, a rear side rod outwardly of said main rod having an eye receiving said body portion of said crank pin, a front side rod having an eye receiving the larger innermost portion of said crank pin, floating bushings mounted respectively on said reduced body portion and said larger innermost portion of said crank pin, said bushings having the same outside diameter, a floating main bushing mounted on said first mentioned floating bushings, a spacer fixed on said main bushing between said main rod and said front side rod, a retaining ring on the outermost end of said crank pin engaging said outer floating bushing, a ring on said outer floating bushing between said retaining ring and said main bushing, said ring having a peripheral flange overlapping said main bushing and projecting radially therebeyond, said main bushing having a projecting flange at the end remote from said flanged ring, said main rod and said front and rear side rods being journaled on said main bushing, bushing rings in said eyes of said rods for cooperation with said main bushing, the space between said ring and said spacer being larger than the combined width of said main rod and said rear side rod, and the space between said spacer and said flange on said main bushing being larger than the width of said front side rod whereby cocking of said rods is accommodated.

TRACY V. BUCKWALTER.